United States Patent [19]

Tsuboshima et al.

[11] 4,242,703
[45] Dec. 30, 1980

[54] PROJECTION APPARATUS FOR OPTICAL SYSTEMS

[75] Inventors: Kosaku Tsuboshima; Shuichi Takayama; Yoshio Nakajima, all of Hachioji; Teruo Iwasawa, Mitaka; Masafumi Yamazaki, Okaya, all of Japan

[73] Assignee: Olympus Optical Co., Ltd., Tokyo, Japan

[21] Appl. No.: 87,231

[22] Filed: Oct. 22, 1979

[30] Foreign Application Priority Data

Nov. 2, 1978 [JP] Japan .............................. 53/134426

[51] Int. Cl.³ ........................................... H04N 7/18
[52] U.S. Cl. ................................. 358/150; 358/42; 358/44; 358/93; 358/105; 358/160; 358/213
[58] Field of Search ............... 358/42, 44, 93, 105, 358/150, 151, 160, 213

[56] References Cited

U.S. PATENT DOCUMENTS

| | | | |
|---|---|---|---|
| 3,804,976 | 4/1974 | Gard | 358/150 |
| 3,931,468 | 1/1976 | Dahlquist | 358/151 |

*Primary Examiner*—Howard W. Britton
*Attorney, Agent, or Firm*—Haseltine, Lake & Waters

[57] ABSTRACT

A projection apparatus for optical systems such as a projection type microscope or the like, which is adapted to project an image of a sample disposed on a movable stage onto a television monitor screen and display it thereon, and which comprises an image sensor composed of a charge transfer element including photosensitive elements aligned with a picture element and operative to receive the image of the sample to be projected; a driving circuit for scanning the image sensor; a television monitor for displaying a video signal obtained from the image sensor when it is scanned by the driving circuit; a memory device for storing the television signal; a stage movement detecting circuit for detecting the movement of the stage; a timer circuit for generating a signal everytime a given time elapses; and a drive control circuit device, when the stage is moving, becomes operative to operate the driving circuit on the basis of the output from the stage movement detecting circuit so as to scan the image sensor everytime the stage moves for a given distance and which, when the stage is stationary, becomes operative to operate the driving circuit on the basis of the signal from the timer circuit so as to scan the image sensor everytime a given time elapses, thereby normally displaying the image of the sample on the television monitor.

13 Claims, 3 Drawing Figures

4,242,703

PROJECTION APPARATUS FOR OPTICAL SYSTEMS

BACKGROUND OF THE INVENTION

This invention relates to a projection apparatus for optical systems such as a projection type microscope or the like, which is adapted to project an image of a sample disposed on a movable stage onto a television monitor screen and display it thereon.

Such kind of apparatus has heretofore been applied to a projection type microscope. In a known projection type microscope, an eyepiece optical system is provided at its one part with a semi-transparent mirror. The light flux transmitted through or reflected by the semi-transparent mirror is guided through a projection optical system to a screen composed of a glass plate or the like.

In such projection type microscope, the semi-transparent mirror is used so as to divide the light flux, so that the amount of light flux becomes small at both the eyepiece optical system and the projection optical system. As a result, the sample becomes so dark that it is difficult to observe it.

Particularly, if an external light incidents on the screen, the image becomes poor in contrast and it is more difficult to observe it.

In addition, the image of the sample is continuously projected onto the screen, and as a result, if the image is observed when the sample is moving, the image flows on the screen rapidly, thereby making the observation of the image difficult.

SUMMARY OF THE INVENTION

An object of the invention, therefore, is to provide a projection apparatus for optical systems, which can obviate the above mentioned drawbacks, which is small in size and simple in construction, and which can obtain a very bright projected image and can project a sample even when it is moving without inducing the flow of image.

A feature of the invention is the provision of a projection apparatus for optical systems, which is adapted to project an image of a sample disposed on a movable stage onto a television monitor screen and display thereon, and which comprises an image sensor composed of a charge transfer element including photosensitive elements aligned with a picture element and operative to receive the image of the sample to be projected; a driving circuit for scanning said image sensor; a television monitor for displaying a video signal obtained from said image sensor when it is scanned by said driving circuit; a memory device for storing the television signal; a stage movement detecting circuit for detecting the movement of said stage; a timer circuit for generating a signal everytime a given time elapses; and a driver control circuit which, when said stage is moving, becomes operative to operate said driving circuit on the basis of the output from said stage movement detecting circuit so as to scan said image sensor everytime said stage moves for a given distance and which, when said stage is stationary, becomes operative to operate said driving circuit on the basis of the signal from said timer circuit so as to scan said image sensor everytime a given time elapses, thereby normally displaying the image of said sample on said television monitor.

Further objects and features of the invention will be fully understood from the following detailed description with reference to the accompanying drawings, wherein:

DETAILED DESCRIPTION OF THE PREFERRED EMBODIMENTS

Figure 1:
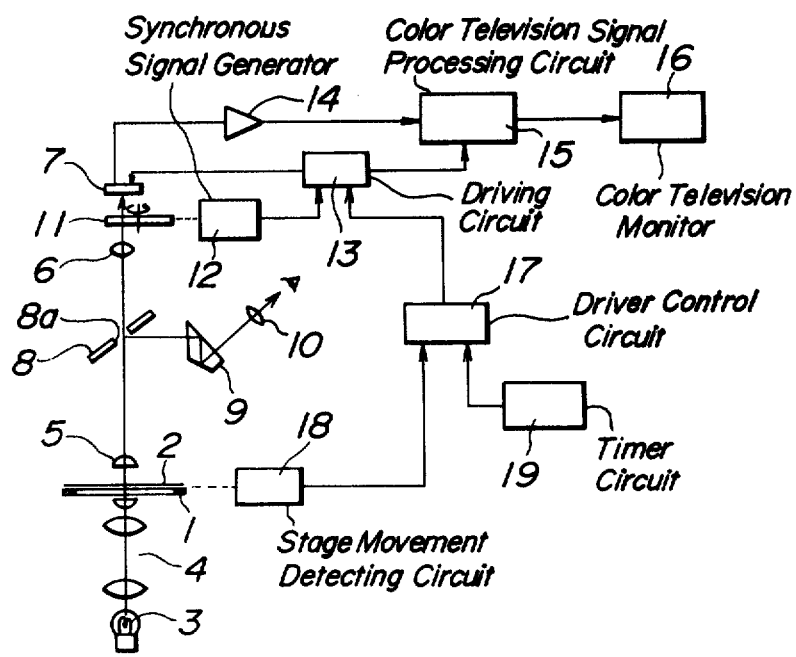
FIG. 1 is a schematic diagram of an embodiment of a projection apparatus for optical systems according to the invention.
Figure 2:
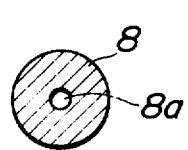
FIG. 2 is a plan view of a reflecting plate shown in FIG. 1.

FIG. 1 diagrammatically shows an embodiment of a projection type microscope to which is applied a projection apparatus for optical systems according to the invention. In the present embodiment, a light flux transmitted through a sample 2 disposed on a movable stage 1 is utilized to observe the image of the sample 2. For this purpose, the sample 2 is illuminated by a light flux emitted from a light source 3 and passing through an illuminating optical system 4. A part of the light flux transmitted through the sample 2 passes an objective lens 5 and a focusing lens 6 to form an image of the sample 2 on an image sensor 7. This image sensor 7 is composed of a charge transfer device such as a charge coupled device (CCD) or a bucket brigade device (BBD) or the like and comprises a tow-dimensional array of photosensitive elements per picture element.

On a light path formed between the objective lens 5 and the focusing lens 6 is interposed an apertured reflecting plate 8 having an aperture 8a at its center. A part of light passed through the aperture 8a is utilized to form the image of the sample 2 on the image sensor 7 as described above. The other part of light reflected at the periphery of the aperture 8a passes through a prism 9 and an eyepiece 10 to form an image of the sample 2 and hence to allow the sample 2 to be observed through the eyepiece 10. The image sensor 7 is located at a conjugate position with respect to the pupil of eyes of an observer who observes the sample 2 through the eyepiece 10 and with respect to the objective lens 5.

Figure 3:
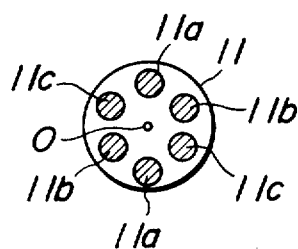
FIG. 3 is a plan view of a color filter plate shown in FIG. 1.

In the present embodiment, between the focusing lens 6 and the image sensor 7 is interposed a rotatable color filter plate 11 which is provided around its periphery with two red pass filters 11a, two green pass filters 11b and two pass filters 11c arranged on the same circle and equidistantly separated from each other as shown in FIG. 3.

The color filter plate 11 is adapted to be rotated around its center axis O at a constant speed.

Referring to FIG. 1, the image sensor 7 is scanned by a predetermined number of frames, for example, one frame according to a field or frame sequential color television system by means of a synchronous signal generator 12 adapted to generate a synchronous signal in synchronism with the rotation of the rotatable color filter plate 11 and a driving circuit 13 adapted to be operated by a signal delivered from a driver control circuit to be described later.

A video signal obtained by the scanning is supplied from the image sensor 7 through a preamplifier 14 to a color television signal processing circuit 15. The color television signal processing circuit 15 functions to synchronize the video signal delivered from the image sensor 7 with a signal delivered from the driving circuit 13. If the color television signal processing circuit 15 is of NTSC type, the color television signal thus obtained is of NTSC system. If the color television signal processing circuit 15 is of PAL type, the color television signal thus obtained is of PAL system. The color television signal thus obtained is supplied to a color television monitor 16 which functions to display a color image of the sample 2.

In the present embodiment, either the television signal processing circuit 15 or the color television monitor 16 has the ability of storing the television signal used for displaying the image of the sample 2.

The driving circuit 13 is operated by means of a driver control circuit 17. The driver control circuit 17 is operative to receive the output signal delivered from a stage movement detecting circuit 18 and the output delivered from a timer circuit 19 adapted to generate a signal everytime a given time elapses. The driver control circuit 17 functions to select either one of the above mentioned outputs in dependence with whether the stage 1 is moving or at a standstill and deliver a given signal to the driving circuit 13. That is, the driver control circuit 17 functions to deliver its output signal to the driving circuit 13 on the basis of the output from the stage movement detecting circuit 18 everytime the stage 1 moves for a given distance, for example, for a distance corresponding to ¼ times the visual field and deliver its output signal to the driving circuit 13 on the basis of the output from the timer circuit 19 everytime a given time elaspses, for example every 1 second elapses when the stage 1 is at a standstill.

As a result, the image sensor 7 is scanned by the driving circuit 13 for a given frame in synchronism with the signal from the synchronizing signal generator 12 everytime the signal is delivered from the driver control circuit 17 to produce a color video signal for at least one frame. This color video signal is supplied to and normally displayed at the color television monitor 16 until the next new color video signal arrives thereat.

In the above described embodiment, the light flux transmitted through the sample 2 is reflected at the reflecting plate 8 having the minute opening 8a and supplied to the eyepiece 10. As a result, it is possible to observe the sufficiently bright sample 2 by means of the eyepiece 10. In addition, the light flux passed through the aperture 8a of the reflecting plate 8 is used to form the image of the sample 2 on the image sensor 7 composed of the charge coupled device or the like. As a result, even though the light flux is not sufficiently bright, the video signal obtained from the image sensor 7 can be easily amplified to a sufficiently high level so as to display the image of the sample 2 on the screen of the color television monitor 16. In addition, the use of the image sensor 7 composed of a charge coupled device of the like provides the important advantage that the optical system as a whole is small in size and that the image of the sample 2 projected onto the image sensor 7 can be displayed on the color television monitor 16 in a sufficiently enlarged scale.

In addition, the image sensor 7 is intermittently scanned and the video signal obtained by some scanning operation is displayed on the color television monitor 16 until the next scanning operation is effected, and as a result, even when the sample 2 is observed while it is moving, it is possible to observe the image of the sample 2 in a considerably precise manner without inducing any image flow.

As stated hereinbefore, the invention is capable of providing a projection apparatus for optical systems, which can obtain an easily observable projected image and which is small in size and simple in construction.

The invention is not limited to the above described embodiment, but various changes and modifications may be made. For example, in order to obtain a color video signal, a stripe filter disposed on the image sensor 7 may be subjected to line-scanning. Alternatively, use may be made of three image sensors and the same images which are different in color may be formed thereon by a combination of semi-transparent mirrors and two color filters or two dichroic mirrors.

In the above described embodiment, the light flux transmitted through the sample 2 is used so as to form the image of the sample 2 on the image sensor 7, but the light flux reflected by the sample 2 may also be used to form an image of the sample 7.

In addition, in the above described embodiment, the color image formed on the image sensor 7 is displayed on the color television monitor 16. But, a monochromatic image may be formed and displayed on a black and white television monitor. In this case, the synchronozing signal generator 12 may be dispensed with so that the color television signal processing circuit becomes more simple in construction and easy in control operation.

What is claimed is:

1. A projection apparatus for optical systems, which is adapted to project an image of a sample disposed on a movable stage onto a television monitor screen and display thereon, and which comprises
   an image sensor composed of a charge transfer element including photosensitive elements aligned with a picture element and operative to receive the image of the sample to be projected;
   a driving circuit for scanning said image sensor;
   a television monitor for displaying a video signal obtained from said image sensor when it is scanned by said driving circuit;
   a memory device for storing the television signal;
   a stage movement detecting circuit for detecting the movement of said stage;
   a timer circuit for generating a signal everytime a given time elapses; and
   a driver control circuit which, when said stage is moving, becomes operative to operate said driving circuit on the basis of the output from said stage movement detecting circuit so as to scan said image sensor everytime said stage moves for a given distance and which, when said stage is stationary, becomes operative to operate said driving circuit on the basis of the signal from said timer circuit so as to scan said image sensor everytime a given time elapses, thereby normally displaying the image of said sample on said television monitor.

2. An apparatus as claimed in claim 1, wherein said image sensor is composed of a charge transfer device.

3. An apparatus as claimed in claim 2, wherein said charge transfer device is a charge coupled device.

4. An apparatus as claimed in claim 2, wherein said charge transfer device is a bucket brigade device.

5. An apparatus as claimed in claim 1, wherein said memory is incorporated into said color television signal processing circuit.

6. An apparatus as claimed in claim 1, wherein said memory is incorporated into said color television monitor.

7. An apparatus as claimed in claim 1, wherein a color video signal is obtained from said image sensor, said color television signal processing circuit is composed of a color encoder and said color television monitor is a color television receiver.

8. An apparatus as claimed in claim 7, wherein provision is made of a rotatable filter plate arranged in front of said image sensor and provided along its periphery with a number of tri-color color filters arranged on a same circle and equidistantly separated from each other.

9. An apparatus as claimed in claim 7, wherein provision is made of a stripe filter of three primary colors arranged in front of the image sensor.

10. An apparatus as claimed in claim 7, wherein provision is made of three image sensors for each color component of three primary colors.

11. An apparatus as claimed in claim 10, wherein provision is made of a color separation optical system including two semi-transparent mirrors and two color filters for transmitting lights which are different in color from each other.

12. An apparatus as claimed in claim 11, wherein said color separation optical system is composed of two semi-transparent mirrors.

13. An apparatus as claimed in claim 11, wherein said color separation optical system is composed of two dichroic mirrors for transmitting lights which are different in color from each other.

* * * * *